Aug. 25, 1964        G. P. MALY        3,146,142
JOINT ADHESIVES
Filed June 7, 1960
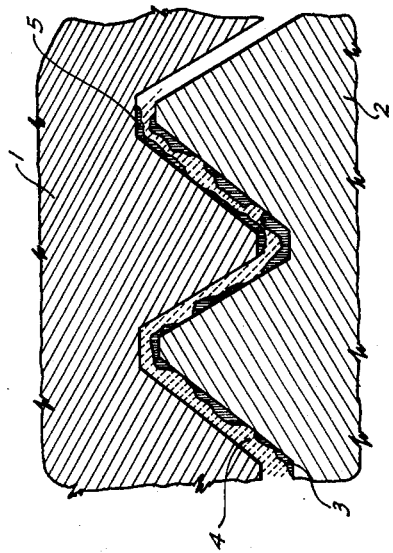
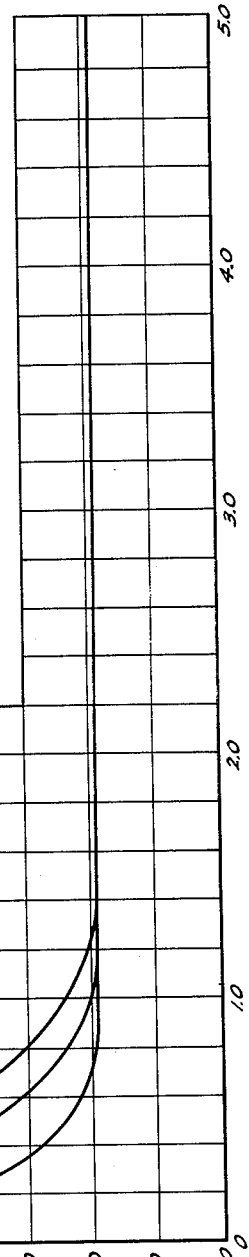
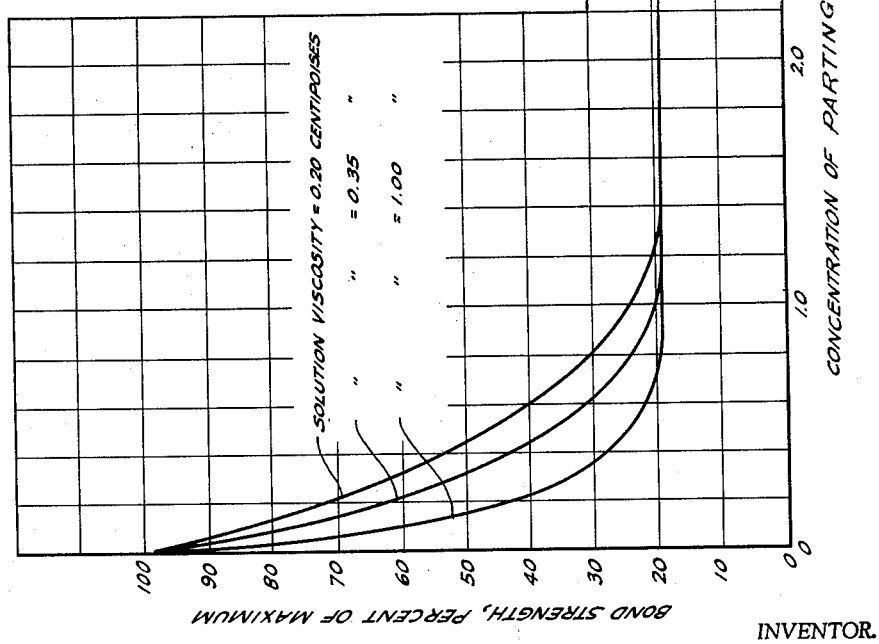
INVENTOR.
GEORGE P. MALY
BY
ATTORNEY 3,146,142
JOINT ADHESIVES
George P. Maly, Fullerton, Calif., assignor to Union Oil Company of California, Los Angeles, Calif., a corporation of California
Filed June 7, 1960, Ser. No. 34,449
7 Claims. (Cl. 156—91)

This invention relates to the bonding of surfaces, to provide strongly adherent joints which can be broken without destruction of the adjoined parts.

In a particular embodiment, this invention relates to the bonding of threaded fittings so securely that the fittings do not loosen when subjected to extreme vibration.

A problem encountered throughout industry is the difficulty in bonding or joining various surfaces to plastic, metal, glass, ceramic, etc., to obtain tight, secure joints which do not loosen with use, yet which can be broken when desired without destruction of the adjoined parts. Threaded joints, e.g., bolts, screw fasteners, pipe joints, etc., are a typical example of this problem. When such joints are employed, they are normally secured by rotating the threaded member or mating member until a compressive force is exerted on the threads. This force, acting on the extended surface of the threads provides a frictional resistance to rotation and loosening of the parts. When this joint is subjected to vibrations, this compressive force is repeatedly diminished and, frequently, is cancelled by the force of vibration. When this occurs, the threaded joint loses its resistance to rotation and the joint loosens.

Various attempts have been made to prevent this loosening of joints by use of mechanical locking devices and various thread coating and bonding agents. A promising approach to this problem has been the use of resinous materials as bonding agents which are cured or hardened after the joint is secured. Unfortunately, however, these resins are frequently too strong as bonding agents to permit disassembly of the joint without heating the joint sufficiently high to destroy the resin, about 150° to 300° C., or without destroying the bonded parts. Attempts have been made to lessen the degree of adhesion by incorporation of plasticizers in the resin; however, these attempts have not met with complete success due to the difficulty in controlling the nature of the final product.

It is an object of this invention to provide a method which bonds adjoining surfaces securely when subjected to vibrational forces yet which readily permits the joint to be disassembled.

I have found that the strength of a joint bonded by resinous bonding agent can be readily controlled by treating the mating surfaces with a parting agent in a manner hereinafter described.

My invention will be described by reference to the drawings of which:

FIGURE 1 is a diagrammatic illustration of the joints achieved in my invention, and FIGURE 2 is a graph of the joint bond strength as a function of the concentration of the parting agent in the solution applied to the adjoining surfaces.

Referring now to FIGURE 1 there is illustrated a joint comprising coupling members 1 and 2 that are adjoined and bonded together by the resinous bonding agent shown at 4. Disposed as an incomplete coating on the surface of one of the said members is the parting agent 3 that surfaces but does not completely coat the mating surface of coupling member 2. Coupling member 1 is also shown to have an incomplete coating of the parting agent at 5.

The resinous bonding agent shown at 4 which is useful in the invention is one having a high adhesive and tensile strength and a high resiliency to withstand vibration. The strength and adherence of the resin is normally so great as to prevent disassembly of the parts in the absence of the novel surface treatment of the invention. To aid the assembly, it is preferred to employ a resin which can be applied as a liquid by dipping, spraying, brushing, etc., and which can be cured to a strong solid resin at ambient or only slightly elevated temperatures. Examples of resins having the desired strength and resiliency characteristics are the following:

Polyvinyl resins, e.g., polyvinyl acetate, polyvinyl acetal, polyvinyl formal, polyvinyl butyral, etc.;

Polyacrylic resins, e.g., polymethyl and polyethyl acrylate, polymethyl, polyethyl, and polybutyl methacrylate, and their derivatives, e.g., the acids, the acid anhydrides, amides, nitriles, halides and salts. A particularly suitable resin for use in the invention is alpha-cyanoacrylate which hardens at room temperature to produce a very adhesive bond;

Urea-formaldehyde resins;

Phenolic resins, e.g., phenol-urea, phenol-formaldehyde, phenol-furfural; and

Epoxide resins, e.g., the epoxy ether condensation polymers obtained by reacting epichlorohydrin with polyhydroxy compounds such as: glycerine, propylene, glycol, hydroxyphenol, dihydroxybenzophenone, bis-(4-hydroxyphenyl)-2,2-propane ("Bis-phenol-A"), bis-(4-hydroxyphenyl)-2,2 butane, tetrachlor-bisphenol-A, etc. Other epoxide resins useful in the invention include the following; styrene oxide, butadiene oxide, the monoxide and dioxide of vinyl cyclohexane, 3,4-epoxy-6-methylcyclohexylmethyl-3,4-epoxy-6-methylcyclohexane - carboxylate, and other epoxides obtained by the action of peracetic acid and the like on such unsaturates as soybean oil, butyl oleate, etc.

When the thermoplastic resins, i.e., polyvinyl and polyacrylic resins are employed, they are preferably mixed with suitable amounts, 5 to 80 percent of a thermosetting resin, such as any of the aforementioned phenolic, epoxy, or urea-formaldehyde resins. In some instances the metal surfaces are first coated with a liquid phenol-formaldehyde resin and the polyvinyl resin, e.g., polyvinyl formal or polyvinyl butyrol is placed between the resin coated surfaces and cured.

After the surfaces have been joined, the resins are normally cured or hardened by a polymerization, condensation or addition reaction which is initiated at ambient or elevated temperatures. The vinyl and acrylic resins are hardened generally by the action of a peroxide or azoisobutyronitrile which can be incorporated into the prepolymer liquid before it is applied to the surface. The curing of these resins can be greatly accelerated by slightly elevated temperatures or by subjecting the joint to ionizing radiation such as gamma or beta rays or alpha particles. The thermosetting resins are, of course, cured by heating the joint.

The epoxide resins are the preferred bonding agents of the invention because of their high adhesive strength and resiliency. The cure hardening of these resins is accelerated by the use of various curing agents and catalysts, such as, mono-, di- and tri-amines, polyamides, boron trifluoride complexes and acid anhydrides. Of these agents, the amides initiate the curing of the resin at ambient temperatures are preferred to avoid the need to heat the joint after assembly.

If desired, the epoxide can be mixed with the hardening agent or catalyst before use. In general, compositions containing between about 7 to 25 parts hardener or catalyst per 100 parts of resin are suitable. Such mixtures have shelf lives between about several minutes to 2 years, suitably long for most applications. In other embodiments, the epoxide and the hardener or catalyst can be separately applied to the surfaces.

As previously mentioned, the strength and adherence of the resinous bonding agent is so great as to normally prevent the disassembly of the joined parts without their destruction. In connection with the use of these resins, my invention comprises the treatment of at least a portion of the mating surfaces of the parts to be joined with a parting agent so as to decrease the adherence of the resin to the surfaces in a controllable degree sufficient to permit the breaking of the seal and disassembly of the joint.

I have found that by subjecting the surfaces to a treating operation wherein there is applied a very minor amount of a parting agent shown at 3 and 5 in FIGURE 1, joints can be obtained having a controlled degree of bonding. In this manner, I am able to vary the strength of the joint from the maximum obtained with no parting agent to the minimum obtained when the entire mating surface of the adjoined parts is covered.

In general, any material possessing a lubricating property is useful in my invention. Waxes and silicone compounds are preferred as they can readily be coated on the surfaces. Other adhesive compounds are the halogenated hydrocarbons and polymers thereof, e.g., polytetrafluoroethylene (Teflon) and polychlorotrifluoroethylene (Kel-F), etc. The halogenated hydrocarbons can be employed in suitable solvents while the highly insoluble polymers are best employed as colloidal dispersions in water or a low boiling organic medium, e.g., carbon tetrachloride, benzene, naphtha, etc.

Typical of these waxes are the natural waxes such as animal waxes, e.g., beeswax, shellac, spermaceti, etc.; vegetable waxes, e.g., carnauba, candelilla, ouricury, etc., and hydrogenated derivatives thereof; mineral waxes such as cersein, montan, ozocerite, etc., and partially oxidized derivatives thereof; microcrystalline and paraffin hydrocarbon waxes and chlorinated derivatives thereof. Synthetic waxes useful in the invention are the following: esters of polyhydric alcohols with acids, such as the mono-, di-, or tri-stearates of ethylene glycol, diethylene glycol, polyethylene glycol, glycerol, sorbitol, etc.; Fischer-Tropsch paraffin waxes, and "Carbowaxes," water soluble ethylene oxide polymers having molecular weights between about 900 to 7000.

The silicones useful in the invention are composed of the siloxane unit and have the following structure:

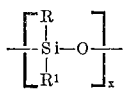

where $x$ varies over a very wide range, e.g., from about 10 to 10,000,000, and R and R' represent various alkyl, allyl and aryl groups, e.g., methyl, ethyl phenyl, etc. Several polymers are commercially available wherein R and R' represent methyl and/or phenyl groups. The polymers have either a chain or a cross-linked structure, the latter being solid resins and the former liquid polymers. A typical silicone resin is manufactured by The Dow Corning Company, "SC-20," and is a three-dimensional cross-linked silicone resin.

The aforementioned parting agents can be applied directly to the surfaces, but preferably, they are dissolved or dispersed in a suitable carrier liquid and applied to the surfaces by dipping the parts into the liquid to cover all or only a portion of the mating surfaces with a film of the liquid. Other suitable means can of course be used such as spraying, brushing, rolling, etc. After the surfaces are coated, excess liquid is permitted to drain and the carrier liquid is volatilized to deposit the parting agent on the surface. Preferably, the carrier liquids which are employed are those volatile at ambient temperatures to avoid the necessity of elevated drying temperatures. Typical of such liquids are water and any volatile organic liquid, e.g., low boiling hydrocarbons such as pentane, hexane, heptane, ethyl benzene, xylene, etc., or mixtures thereof; halogenated hydrocarbons such as carbon tetrachloride, ethylidene dichloride, etc., ketones such as acetone, methyl-ethyl ketone, etc.; alcohols, such as methanol, ethanol, etc.; and miscellaneous other volatile liquids such as acetonitrile, thiophene, etc. In general, these liquids have viscosities between about 0.1 to 2.0 centipoises at ambient temperatures.

As previously mentioned, the liquid solutions or dispersions of the aforementioned parting agents are applied to the mating surfaces of a joint, the carrier liquid volatilized and the joint is then coated with a resin, assembled, and the resin cured. I have found that the deposited amount of the parting agent has a profound effect on the strength of the final joint in that the strength of the joint rapidly decreases with slight increases in amount of agent deposited. As this amount of parting agent is increased, a minimum strength is rapidly reached after which further increases in amount of the parting agent deposited have no effect on the strength of the joint. It is believed that at this transition point, the entire surface of the mating surfaces is covered with the parting agent and therefore further increases in deposited amounts do not materially reduce the strength. In my invention, the deposited amount of parting agent is readily controlled at any desirable point below this transition point by the concentration of the parting agent in the liquid and by the viscosity of the liquid. This transition amount will vary somewhat, dependent on the identity and nature of the parting agent and dependent on the type of joint, e.g., when threaded surfaces are coated, greater deposited amounts of the parting agent are required than when the surfaces are completed smooth.

Referring now to the FIGURE 2, there is illustrated the typical effect of solution viscosity and parting agent concentration on joint strength which I have observed and utilize in my invention. The particular curve is achieved by dipping tapered steel pins and a steel plate with mating holes into a petroleum ether solution (pentane and hexane) of a silicone resin at concentrations of 0.1 to 5 weight percent and solution viscosities of about 0.1 to 1.0 centipoise at 20° C. These pins and the plate are then air-dried and their mating surfaces are thereafter coated with an epoxy resin. The particular epoxy employed is the reaction product of epichlorohydrin and "Bisphenol A" and has an epoxy equivalent of about 180-200. A polyamide hardening agent is incorporated into the epoxy resin. The steel pins are then inserted into the mating tapered bores in the metal plate and the epoxy resin is cured at about 25° C. for 16 hours. After curing, a torque indicating wrench is used to loosen the pins from the holes and the amount of torque required for each recorded. The results are depicted in the FIGURE 2 line A where it is shown that the degree of bonding is critically affected by the concentration of the parting agent for a solution with a viscosity of about 0.3 to 0.4 cp. This graph shows that below the transition point which occurs at 1.0 weight percent silicone, the greater the solution concentration of parting agent, the less is the bond strength. Also shown in the figure are lines B and C, which illustrate similar relationships for solutions having different viscosities. The solution viscosity of line B is 0.2 centipoise, that of line C is 1.0 centipoise. This family of curves shows that the greater the liquid viscosity, the less is the bond strength for the same concentration of parting agent. To achieve the most sensitive control over the bond strength, I prefer to employ solutions having the lowest viscosities, about 0.1 to 0.3 centipoise, e.g., petroleum ether, acetone, etc. Use of such solutions raises the transition concentration and thus expands the useable concentration range. This in turn reduces the sensitivity of the bond to the parting agent concentration and provides closer control of the final bond strength.

The following will exemplify compositions of parting agents useful in my invention:

| | Weight percent |
|---|---|
| Silicone resin | 1 |
| Petroleum naphtha | 99 |
| Carnauba wax | 0.5 |
| Triethanol amine | 99.5 |
| Oxidized microcrystalline wax | 1.0 |
| Trichloroethylene | 99.0 |
| Candellila wax | 3.0 |
| Low boiling naphtha | 97.0 |
| Carnauba wax | 1.0 |
| Emulsifier | 0.1 |
| Water | 98.9 |

Various ionic and non-ionic type emulsifiers can be employed in the latter composition, e.g., morpholine is a well suited material but others can also be employed such as the sulfonated and sulfated oils and alcohols, amine and alkali soaps, glyceryl and glycol fatty esters, glycol ethers, etc.

The following examples will illustrate use of my invention.

*Example 1*

In this and following examples, the joints are made with 3-inch E.U. API steel tubing having typical conical pipe threads. A 1.65 weight percent solution of a cross-linked silicone resin in hexane is applied to the male threads of the tubing, air dried, and the threads are then coated with an epoxy resin containing 14 parts of catalyst per 100 parts of resin. The joint is tightened with the application of 330 foot pounds torque and the epoxy resin cured at ambient temperature. When cured, the joint held 3000 p.s.i. without leaking under extensive vibration of about 150 cycles per second. The joint requires 4000 foot pounds torque to move and 6000 foot pounds torque for 3 full turns to completely unscrew. This later characteristic illustrates the sustained torque of the joint, i.e., requiring an equal and, in some cases, a greater torque to disassemble the joint than required to initially break the joint. This is believed due to the presence of the resin which, although removed from adhesion with the metal surfaces, is still tightly packed between the metal surfaces. After disassembly, visual inspection of the pipe threads reveals them to be clean and free of galling. When the epoxy resin is applied to the joint without the parting agent, it is impossible to disassemble the joint without the application of heat. Attempts to break the joint result in the surface destruction of the pipe and breakage of the torque wrench at about 9000 foot pounds.

*Example 2*

The coating of both the male and female threads of a joint in the aforedescribed pipe with an 0.5 weight percent silicone resin in hexane followed by air drying, epoxy coating and curing produced a joint which required 6750 foot pounds of torque to disassemble. With use, however, of 5 weight percent silicone, only 2750 foot pounds are required. The use of a 1.2 weight percent silicone solution requires 5600 foot pounds of torque to disassemble.

The foregoing examples have been for purposes of illustration only and are not to be construed as limiting of the invention. Other modes of applying my invention can be employed, change being made as regards the methods or materials, provided the step or steps stated by any of the following claims or the equivalents thereof be used.

I claim:

1. The method of forming a resin bond of controlled strength between mating surfaces of coupling members which comprises: coating at least one of said surfaces with a parting agent and controlling the extent of coating of said parting agent so as to effect an incomplete coating of said surface by controlling the amount of said parting agent to an amount sufficient to cause a decrease in the strength of said resin bond but in an amount less than the transitional amount beyond which an increase in amount of said parting agent causes no corresponding decrease in bond strength, thereafter applying a resinous cement selected from the class consisting of polyvinyl, polyacrylic, urea-formaldehyde, phenolic and epoxide cements to said surfaces, mating said surfaces and thereafter hardening said resinous cement to form said bond between said mating surfaces.

2. The method of claim 1 including the additional step of providing for said mating surfaces male and female coupling surfaces and applying said coatings to said male coupling surface.

3. The method of claim 1 wherein said resinous cement is an epoxy resin containing an amide type hardening agent.

4. The method of claim 3 wherein said parting agent is a silicone resin.

5. The method of claim 4 wherein said silicone resin is applied to said surfaces in a carrier liquid and said silicone resin is deposited on said surfaces by the volatilization of said carrier liquid.

6. The method of claim 5 wherein the concentration of said silicon resin in said carrier liquid is less than about 5 weight percent and said carrier liquid has a viscosity between about 0.1 and 2.0 centipoises at 20° C.

7. The method of claim 1 wherein the extent of coating of said bonding agent is controlled by maintaining the concentration of said parting agent in a carrier liquid and the viscosity of said carrier liquid at predetermined values.

References Cited in the file of this patent

UNITED STATES PATENTS

| 351,605 | Kennedy | Oct. 26, 1886 |
| 1,859,311 | McEvoy | May 24, 1932 |
| 2,321,414 | Parker | June 8, 1943 |
| 2,939,805 | Johnson | June 7, 1960 |